United States Patent [19]

Sakata et al.

[11] Patent Number: 5,430,112
[45] Date of Patent: Jul. 4, 1995

[54] EPOXY RESIN AND POLYTHIOL COMPOSITION

[75] Inventors: Hiroyuki Sakata; Tadahiko Yokota; Kenichi Mori; Kiyomiki Hirai, all of Kawasaki; Koji Takeuchi, Tokyo; Toshihiko Hatajima, Kawasaki, all of Japan

[73] Assignee: Ajinomoto, Co., Inc., Tokyo, Japan

[21] Appl. No.: 139,149

[22] Filed: Oct. 21, 1993

[30] Foreign Application Priority Data

| Oct. 22, 1992 [JP] Japan | 4-284300 |
| Aug. 23, 1993 [JP] Japan | 5-227851 |
| Aug. 23, 1993 [JP] Japan | 5-227852 |

[51] Int. Cl.⁶ ............................................. C08F 283/00
[52] U.S. Cl. .............................. 525/526; 525/504; 525/513; 525/528; 525/535; 528/93; 528/103; 528/109
[58] Field of Search ............. 525/526, 535, 504, 513, 525/528; 528/109, 93, 103

[56] References Cited

U.S. PATENT DOCUMENTS

| 3,860,541 | 1/1975 | Lehmann et al. | 525/523 |
| 3,873,502 | 3/1975 | Hickner et al. | 528/109 |
| 4,092,293 | 5/1978 | Harris et al. | 525/523 |
| 4,101,459 | 7/1978 | Andrews | 528/109 |
| 4,542,202 | 9/1985 | Takeuchi et al. | 525/504 |
| 4,546,155 | 10/1985 | Hirose et al. | 525/504 |
| 4,562,241 | 12/1985 | Renner | 528/99 |
| 4,833,226 | 5/1989 | Ishimura et al. | 528/45 |
| 4,882,216 | 11/1989 | Takimoto et al. | 525/523 |
| 5,128,424 | 7/1992 | McGinnis et al. | 525/504 |
| 5,214,098 | 5/1993 | Setiabudi et al. | 525/523 |
| 5,274,054 | 12/1993 | Moser et al. | 525/504 |

FOREIGN PATENT DOCUMENTS

| 1080866 | 6/1953 | France. |
| 1403184 | 5/1965 | France. |

OTHER PUBLICATIONS

Database WPI, Derwent Publications Ltd., AN 87-224928, JP-A-62 149 778, Jul. 3, 1987.
Database WPI, Derwent Publications Ltd., AN 81-48830D, JP-A-56 057 820, May 20, 1981.

*Primary Examiner*—Robert E. Sellers
*Assistant Examiner*—Randy Gulakowski
*Attorney, Agent, or Firm*—Oblon, Spivak, McClelland, Maier, & Neustadt

[57] ABSTRACT

Epoxy resin compositions which contain (1) an epoxy resin which has two or more epoxy groups in its molecule, (2) a polythiol compound which has two or more thiol groups in its molecule and (3) an accelerator which is (i) a solid dispersion-type amine adduct latent curing accelerator or (ii) the product of a reaction between a compound which contains one or more isocyanate groups in its molecule and a compound which has at least one primary and/or secondary amino group in its molecule, exhibit excellent curability at relatively low heating temperatures as well as a long working life.

15 Claims, No Drawings

EPOXY RESIN AND POLYTHIOL COMPOSITION

FIELD OF THE INVENTION

The present invention relates to a polythiol epoxy resin compositions which cure rapidly at relatively low heating temperatures, provide a strong adhesive strength and long working life, and thus are suitable for processing. The present invention also relates to cured epoxy resins prepared by heating such compositions.

DISCUSSION OF THE BACKGROUND

Epoxy resin compositions which use polythiol as a curing agent and a liquid tertiary amine as an accelerator are known as low-temperature, rapid-curing epoxy resin compositions which may be cured at $-20°$ C. to $0°$ C., and these are widely used in adhesives, sealing agents, casting materials and the like.

However, such epoxy resin compositions are disadvantageous in that their pot life is very short, usually a few seconds to a few minutes after mixing, and thus there is not enough time for mixing, defoaming and application. Also, since the user must prepare a new composition each time, the working efficiency is lowered, and since the excess composition cannot be preserved it must be disposed of, which is disadvantageous from the point of view of conservation of resources and environmental problems.

Thus, it has been desired to develop a polythiol epoxy resin composition which has a sufficiently long working life and a good working efficiency. Nevertheless, the commercially available epoxy resins which contain thiol compounds generally have a poor shelf life, and it is difficult to increase the working life of epoxy resin compositions when used with thiol curing agents.

As a method to solve such problems, a method has been investigated in which an acid anhydride or mercapto organic acid is added to the resin as a retarder to lengthen the working life thereof (Japanese laid-open patent application S61-159417), but this method cannot be said to be sufficiently satisfactory.

On the other hand, examples of a thiol compound obtained by an esterification reaction between a polythiol and a mercapto organic acid which is used as a curing agent for epoxy resins are described in Japanese laid-open patent application S41-7236, Japanese laid-open patent application S42-26535, Japanese laid-open patent application S47-32319, Japanese laid-open patent application S46-732 and Japanese laid-open patent application S60-21648, but the accelerators used in these epoxy resin compositions are liquid amines, etc. Also, the compositions using these liquid amines, etc. have a very short working life of from a few minutes to a few dozen minutes, which is a serious disadvantage.

Thus, there remains a need for polythiol epoxy resin compositions which exhibit good curability at relatively low temperatures and also exhibit a long working life.

SUMMARY OF THE INVENTION

Accordingly, it is one object of the present invention to provide novel polythiol epoxy resin compositions which exhibit good curability at relatively low heating temperatures.

It is another object of the present invention to provide novel polythiol epoxy resin compositions which exhibit a long working life.

It is another object of the present invention to provide novel polythiol epoxy resin compositions which exhibit good adhesive strength.

It is another object of the present invention to provide cured compositions obtained by heating such polythiol epoxy resin compositions.

These and other objects, which will become apparent during the following detailed description have been achieved by the inventors' discovery that a polythiol epoxy resin composition which has a sufficiently long working life, cures rapidly at relatively low heating temperatures, and also has a strong adhesive strength may be obtained by using as the curing agent a polythiol compound which has two or more thiol groups in its molecule and using as the curing accelerator (i) a solid dispersion-type amine adduct latent curing accelerator or (ii) the product of a reaction between a compound which contains one or more isocyanate groups in its molecule and a compound which has at least one primary and/or secondary amino group in its molecule.

That is, the present invention relates to an epoxy resin composition which contains (1) an epoxy resin which has two or more epoxy groups in its molecule, (2) a polythiol compound which has two or more thiol groups in its molecule and (3) an accelerator which is (i) a solid dispersion-type amine adduct latent curing accelerator or (ii) a compound obtained as the product of a reaction between a compound which contains one or more isocyanate groups in its molecule and a compound which has at least one primary and/or secondary amino group in its molecule.

DETAILED DESCRIPTION OF THE PREFERRED EMBODIMENTS

The epoxy resin (1) to be used according to the present invention may be any one which has an average of two or more epoxy groups per molecule. Examples thereof include polyglycidyl ethers which are obtained by reacting a polyhydric phenol such as bisphenol A, bisphenol F, bisphenol AD, catechol, resorcinol, etc. or a polyhydric alcohol such as glycerin or polyethylene glycol, etc. with epichlorohydrin; glycidyl ether esters which are obtained by reacting a hydroxycarboxylic acid such as p-hydroxybenzoic acid or $\beta$-hydroxynaphthoic acid with epichlorohydrin; polyglycidyl esters which are obtained by reacting a polycarboxylic acid such as phthalic acid or terephthalic acid with epichlorohydrin; as well as epoxidized phenolic novolac resins, epoxidized cresol novolac resins, epoxidized polyolefins, cyclic aliphatic epoxy resins, and also urethane modified epoxy resins and the like, but it is not limited to these examples.

The polythiol compound (2) to be used according to the present invention is a thiol compound which has two or more thiol groups in its molecule, and which does not require the use of a basic substance for its production, such as a thiol compound obtained by the esterification reaction of a mercapto organic acid with a polythiol such as, for example, trimethylolpropane tris-(thioglycolate), pentaerythritol tetrakis-(thioglycolate), ethyleneglycol dithioglycolate, trimethylolpropane tris-($\beta$thiopropionate), pentaerythritol tetrakis-($\beta$-thiopropionate), dipentaerythritol poly($\beta$-thiopropionate), etc.

In the same manner, thiol compounds with two or more thiol groups in their molecules for which basic substances are used as reaction catalysts during the steps of their production may be used, when combined with a dealkalizing treatment to reduce the alkali metal ion concentration to 50 ppm or less, preferably 10 ppm or less, based on the total weight of the thiol compound. Such thiol compounds include alkyl polythiol compounds such as 1,4-butanedithiol, 1,6-hexanedithiol and 1,10-decanedithiol; terminal thiol group-containing polyethers, terminal thiol group-containing polythioethers, thiol compounds obtained by a reaction of an epoxy compound with hydrogen sulfide; and thiol compounds containing a terminal thiol group which are obtained by a reaction of a polythiol compound with an epoxy compound.

As the method for dealkalization treatment of the polythiol compounds prepared using a basic substance as a reaction catalyst may be mentioned, for example, a method in which the thiol compound to be treated is dissolved in an organic solvent such as acetone or methanol, and an acid such as dilute hydrochloric acid or dilute sulfuric acid is added thereto for neutralization to a pH of 5.0 to 7.1, preferably about 6.5 to 7.0, after which extraction and washing are carried out for desalting. Alternative methods include a method of adsorption using anion-exchange resin, a method of purification by distillation, etc., but dealkalization is not limited to these methods.

The solid dispersion-type amine adduct latent curing accelerator (3)(i) to be used according to the present invention is the product of a reaction between (b) an amine compound and (a) an epoxy compound which is a solid, insoluble in the epoxy resin at room temperature, and which functions as an accelerator by becoming soluble upon heating as described in U.S. Pat. Nos. 4,542,202, 4,546,155, Japanese Patent publication (KOUKOKU) HEI 5-4409 and Japanese Patent Publication (KOUKOKU) HEI 5-57690; this also includes those reaction products whose surfaces have been treated with an isocyanate compound or acidic compound, etc. as described in U.S. Pat. No. 4,833,226.

As examples of the epoxy compound (a) to be used as a starting material for the production of the latent curing accelerator (3)(i) which is used according to the present invention may be mentioned polyfunctional epoxy compounds such as polyglycidyl ethers which are obtained by reacting a polyhydric phenol such as bisphenol A, bisphenol F, catechol, resorcinol, etc. or a polyhydric alcohol such as glycerin or polyethylene glycol, etc. with epichlorohydrin; glycidyl ether esters which are obtained by reacting a hydroxycarboxylic acid such as p-hydroxybenzoic acid or 3-hydroxynaphthoic acid with epichlorohydrin; polyglycidyl esters which are obtained by reacting a polycarboxylic acid such as phthalic acid or terephthalic acid with epichlorohydrin; glycidylamine compounds which are obtained by reacting 4,4'-diaminodiphenylmethane, m-aminophenol or the like with epichlorohydrin; and epoxidized phenolic novolac resins, epoxidized cresol novolac resins, epoxidized polyolefins, as well as monofunctional epoxy compounds such as butyl glycidyl ethers, phenyl glycidyl ethers, glycidyl methacrylate and the like, but the epoxy compound is not limited to these examples.

The amine compound (b) to be used as a starting material for the production of the latent curing accelerator (3)(i) which is used according to the present invention may be any one which has in its molecule one or more active hydrogens capable of an addition reaction with an epoxy group, as well as one or more substituents selected from primary, secondary and tertiary amino groups. Examples of such amine compounds are given below, but the amine compounds are not limited thereto.

It may be, for example, an aliphatic amine such as diethylenetriamine, triethylenetetraamine, n-propylamine, 2-hydroxyethylaminopropylamine, cyclohexylamine, 4,4'-diamino-dicyclohexylmethane; an aromatic amine compound such as 4,4'-diaminodiphenylmethane, 2-methylaniline, etc.; or a nitrogenous heterocyclic compound such as 2-ethyl-4-methylimidazole, 2-methylimidazole, 2-ethyl-4-methylimidazoline, 2,4-dimethylimidazoline, piperidine, piperazine, etc.

Furthermore, of these compounds, particularly those which have tertiary amino groups in their molecules are materials which will provide latent curing accelerators (3(i)) with excellent accelerating properties, and examples of such compounds include, for example, amine compounds such as dimethylaminopropylamine, diethylaminopropylamine, di-npropylaminopropylamine, dibutylaminopropylamine, dimethylaminoethylamine, diethylaminoethylamine, N-methylpiperazine, etc.; primary and secondary amines which have a tertiary amino group in their molecules, such as imidazole compounds like 2-methylimidazole, 2-ethylimidazole, 2-ethyl-4-methylimidazole, 2-phenylimidazole, etc.; and alcohols, phenols, thiols, carboxylic acids, hydrazides, etc. which have a tertiary amino group in their molecules, including 2-dimethylaminoethanol, 1-methyl-2-dimethylaminoethanol, 1-phenoxymethyl-2-dimethylaminoethanol, 2-diethylaminoethanol, 1-butoxymethyl-2-dimethylaminoethanol, 1-(2-hydroxy-3-phenoxypropyl)-2-methylimidazole, 1-(2-hydroxy-3-phenoxypropyl)-2-ethyl-4-methylimidazole, 1-(2-hydroxy-3-butoxypropyl)-2-methylimidazole, 1-(2-hydroxy-3-butoxypropyl)-2-ethyl-4-methylimidazole, 1-(2-hydroxy-3-phenoxypropyl)-2-phenylimidazoline, 1-(2-hydroxy-3-butoxypropyl)-2-methylimidazoline, 2-(dimethylaminomethyl)phenol, 2,4,6-tris(dimethylaminomethyl)phenol, N-$\beta$-hydroxyethylmorpholine, 2-dimethylaminoethanethiol, 2-mercaptopyridine, 2-mercaptobenzoimidazole, 2-mercaptobenzothiazole, 4-mercaptopyridine, N,N-dimethylaminobenzoic acid, N,N-dimethylglycine, nicotinic acid, isonicotinic acid, picolinic acid, N,N-dimethylglycine hydrazide, N,N-dimethylpropionic acid hydrazide, nicotinic acid hydrazide, isonicotinic acid hydrazide, etc.

In order to further improve the shelf life of the epoxy resin composition according to the present invention, when the addition reaction is conducted with the above mentioned epoxy compound and amine compound to produce the latent curing accelerator (3)(i) to be used according to the present invention, (c) an active hydrogen compound having two or more active hydrogens in its molecule may be added thereto as a third component. Examples of such an active hydrogen compound are given below, but the active hydrogen compound is not limited thereto.

The active hydrogen compound (c) may be, for example, a polyhydric phenol such as bisphenol A, bisphenol F, bisphenol S, hydroquinone, catechol, resorcinol, pyrogallol, phenolic novolac resin, etc.; a polyhydric alcohol such as trimethylolpropane, etc.; a polyhydric carboxylic acid such as adipic acid, phthalic acid, etc.; or 1,2-dimercaptoethane, 2-mercaptoethanol, 1-mercapto-3-phenoxy-2-propanol, mercaptoacetic acid, anthranilic acid, lactic acid, etc.

Representative examples are given below of the isocyanate compound to be used as the surface treatment agent for the production of the latent curing accelerator (3)(i) used according to the present invention, but the isocyanate compound is not limited thereto these examples.

The isocyanate comound may be, for example, a monofunctional isocyanate compound such as n-butyl isocyanate, isopropyl isocyanate, phenyl isocyanate, benzyl isocyanate, etc.; a polyfunctional isocyanate compound such as hexamethylene diisocyanate, tolylene diisocyanate, 1,5-naphthylene diisocyanate, diphenylmethane-4,4'-diisocyanate, isophorone diisocyanate, xylylene diisocyanate, p-phenylene diisocyanate, 1,3,6-hexamethylene triisocyanate, bicycloheptane triisocyanate, etc.; and also terminal isocyanate-containing compounds obtained by reactions of these polyfunctional isocyanate compounds and active hydrogen compounds may be used, examples of which include a terminal isocyanate-containing addition reaction product obtained by a reaction of tolylene diisocyanate with trimethylolpropane, and a terminal isocyanate-containing addition reaction product obtained by a reaction of tolylene diisocyanate with pentaerythritol.

The acidic substance to be used as the surface treatment agent for the production of the latent curing accelerator (3)(i) used according to the present invention may be a gaseous or liquid inorganic or organic acid, and representative examples thereof are given below; however, the acidic substance is not limited to these examples.

The acidic substance may be, for example, carbon dioxide, sulfur dioxide, sulfuric acid, hydrochloric acid, oxalic acid, phosphoric acid, acetic acid, formic acid, propionic acid, adipic acid, caproic acid, lactic acid, succinic acid, tartaric acid, sebacic acid, p-toluenesulfonic acid, salicylic acid, boric acid, tannic acid, alginic acid, polyacrylic acid, polymethacrylic acid, phenol, pyrogallol, phenol resin, resorcin resin, etc.

The latent curing accelerator (3)(i) to be used according to the present invention may be easily obtained mixing the above mentioned components (a) an epoxy compound and (b) an amine compound, or (a) an epoxy compound, (b) an amine compound and (c) an active hydrogen compound, and reacting them at from room temperature to 200° C., and then solidifying and crushing the product thereof, or by reacting them in a solvent such as methyl ethyl ketone, dioxane, tetrahydrofuran or the like, removing the solvent, and then crushing the solid fraction thereof. Furthermore, the surface treatment of these latent curing accelerators may be carried out by contacting them with any of the above mentioned isocyanate compounds or acidic compounds in a solvent such as methyl ethyl ketone, toluene, etc. or with no solvent.

Commercially available representative examples of the above mentioned solid dispersion-type amine adduct latent curing accelerator (3)(i) are given below, but it is not limited to these examples. For example, mention may be made of "Ajicure PN-231 (trademark, Ajinomoto, Inc.), "Ajicure PN-H" (trademark, Ajinomoto, Inc. ), "Ajicure MY-24" (trademark, Ajinomoto, Inc.), "Hardener X-3661S" (trademark, A.C.R. Co., Ltd.), "Hardener X-3670S" (trademark, A.C.R. Inc.), "Novacure HX-3742" (trademark, Asahi Chemical Industry Co., Ltd.), "Novacure HX-3721" (trademark, Asahi Chemical Industry Co., Ltd.), etc.

The compound to be used according to the present invention which is obtained by a reaction between a compound which contains one or more isocyanate groups in its molecule and a compound which has at least one primary and/or secondary amino group in its molecule (3)(ii), may be obtained by reacting the isocyanate with a compound which has a primary and/or secondary amino group in an organic solvent such as dichloromethane.

As the above mentioned compound which contains one or more isocyanate groups in its molecule may be mentioned, for example, n-butyl isocyanate, isopropyl isocyanate, 2-chloroethyl isocyanate, phenyl isocyanate, p-bromophenyl isocyanate, m-chlorophenyl isocyanate, o-chlorophenyl isocyanate, p-chlorophenyl isocyanate, 2,5-dichlorophenyl isocyanate, 3,4-dichlorophenyl isocyanate, 2,6-dimethylphenyl isocyanate, o-fluorophenyl isocyanate, p-fluorophenyl isocyanate, m-tolyl isocyanate, p-tolyl isocyanate, o-trifluoromethylphenyl isocyanate, m-trifluoromethylphenyl isocyanate, benzyl isocyanate, hexamethylene diisocyanate, 2,4-tolylene diisocyanate, 2,6-tolylene diisocyanate, 1,5-naphthylene diisocyanate, diphenylmethane-4,4'-diisocyanate, 2,2-dimethyldiphenylmethane-4,4'-diisocyanate, tolidene diisocyanate, isophorone diisocyanate, xylene diisocyanate, 1,3-bis(isocyanatomethyl)-cyclohexane, p-phenylene diisocyanate, 1,3,6-hexamethylene triisocyanate, bicycloheptane triisocyanate, tris-(3-isocyanato-4-methylphenyl) isocyanurate, tris-(6-isocyanatohexyl) isocyanurate, etc., but the compound is not limited to these examples.

As the compound which has at least one primary and/or secondary amino group in its molecule and which reacts with the isocyanate may be mentioned, for example, dimethylamine, diethylamine, di-n-propylamine, di-n-butylamine, di-n-hexylamine, di-n-octylamine, di-n-ethanolamine, dimethylaminopropylamine, diethylaminopropylamine, morpholine, piperidine, 2,6-dimethylpiperidine, 2,2,6,6-tetramethylpiperidine, piperazine, pyrrolidine, benzylamine, N-methylbenzylamine, cyclohexylamine, m-xylylenediamine, 1,3-bis-(aminomethyl)cyclohexane, isophoronediamine, N-aminoethylpiperazine, 2-methylimidazole, 2-ethyl-4-methylimidazole, 2-undecylimidazole, 2-phenylimidazole, 1,1-dimethylhydrazine, etc., but the compound is not limited to these examples.

In addition, as the accelerator may be used a solid dispersion-type latent curing accelerator, such as the one described in Japanese Patent Application Publication HEI 3-296525 which is obtained by reacting an epoxy resin having two or more epoxy groups in its molecule as a third ingredient during a reaction with N,N-dialkylaminoalkylamine, an amine having an active hydrogen in its molecule and having a cyclic structure which includes one or two nitrogen atoms, and a diisocyanate.

Commercially available dispersion-type latent curing accelerators include "Fujicure FXE-1000" (trademark, Fuji Chemical Industry Co., Ltd.), "Fujicure FXR-1030" (trademark, Fuji Chemical Industry Co., Ltd.), etc.

The mixing ratio of the epoxy resin (1) and polythiol compound (2) in the epoxy resin composition according to the present invention is such that the ratio of epoxy equivalents to thiol equivalents is 0.5–1.5, preferably 0.75 to 1.3, and the amount to be added of the solid dispersion type latent curing accelerator (3)(i) or the compound obtained by a reaction of a compound which contains one or more isocyanate groups in its molecule with a compound which has at least one primary and/or secondary amino group in its molecule (3)(ii), is 0.1–10, preferably 0.5–5, parts by weight of (3)(i) or (3)(ii) to 100 parts by weight of the epoxy resin.

As necessary, any number of additives may be added to the epoxy resin composition according to the present invention, including fillers, diluting agents, solvents, pigments, flexibilizer, coupling agents, anti-oxidants, and the like.

If an isocyanate group-containing compound is used as an additive, then the adhesive strength may be improved without significantly impairing the curability of the resin. Such isocyanate-containing compounds to be used are not particularly limited, and representative examples thereof include n-butyl isocyanate, isopropyl isocyanate, 2-chloroethyl isocyanate, phenyl isocyanate, p-chlorophenyl isocyanate, benzyl isocyanate, hexamethylene diisocyanate, 2-ethylphenyl isocyanate, 2,6-dimethylphenyl isocyanate, 2,4-tolylene diisocyanate, 2,6-tolylene diisocyanate, 1,5-naphthylene diisocyanate, diphenylmethane-4,4'-diisocyanate, tolidine diisocyanate, isophorone diisocyanate, xylylene diisocyanate, paraphenylene diisocyanate, 1,3,6-hexamethylene triisocyanate, bicycloheptane triisocyanate, etc.

The amount of the isocyanate group-containing compound to be added to the epoxy resin composition according to the present invention is in the range of 0.1–20, preferably 0.5 to 10, parts by weight to 100 parts by weight of the epoxy resin.

The present epoxy resin compositions may be cured to form cured articles by simply heating the epoxy resin composition. The degree of heating may vary depending on the cure time deemed acceptable. Generally, the composition will be cured at a temperature of 40° C. to 200° C., preferably 60° C. to 150° C. Thus, the present compositions can be cured to form, e.g., cast articles or adhesive layers.

Other features of the invention will become apparent in the course of the following descriptions of exemplary embodiments which are given for illustration of the invention and are not intended to be limiting thereof.

EXAMPLES

Method of Evaluation

Shelf life: The prepared epoxy resin composition was poured into a 50 cc glass sampling bottle, and measurement was taken of the time required for the initial viscosity to double when measured at 25° C. using a B-type viscosimeter.

Working life: The prepared epoxy resin composition was poured into a 50 cc glass sampling bottle, and measurement was taken of the time required for the flowability to disappear at 25° C.

Viscosity: Measurement was made based on JIS K-6833.

Gel time: Measurement was made using a Yasuda gel timer.

Tensile shear adhesive strength: A sample prepared based on JIS K-6850 was cured at a specific temperature and for a specific time, and the tensile shear adhesive strength was measured using a Tensilon Universal Testing Machine (Tensilon UTM-5T, product of Toyo Seiki, Inc.

Measuring temperature: 25° C.
Tension speed: 1 mm/min

T-peel adhesive strength: A sample prepared based on JIS K6854 was cured at a specific temperature and for a specific time, and the tensile shear adhesive strength was measured using a Tensilon Universal Testing Machine (Tensilon RTM-500, product of Orientech, Inc.).

Measuring temperature: 25° C.
Tension speed: 50 mm/min

Alkali metal ion concentration: Assay was made according to the atomic absorption method, using a flame spectrophotometer (Hitachi Model 180-50).

The names of the materials used in the Examples are as follows.

(1) Epoxy resin
"EP-828" (trade name, Yuka Shell Epoxy Co.) Bisphenol A-type epoxy resin with epoxy equivalents 184–194 "EP-152" (trade name, Yuka Shell Epoxy Co.)
Phenolic novolac-type epoxy resin with epoxy equivalents 172–178
"EP-154" (trade name, Yuka Shell Epoxy Co.)
Phenolic novolac-type epoxy resin with epoxy equivalents 176–180

(2) Polythiol compound
"TMTP" (trade name, Yodo Kagaku Co.)
Trimethylolpropane tris($\beta$-thiopropionate)
$K^+ < 0.5$ ppm, $Na^+ < 2.9$ ppm
"TMTP" (trade name, Yodo Kagaku Co.)
Trimethylolpropane tris($\beta$-thioglycolate)
"PETG" (trade name, Yodo Kagaku Co.)
Pentaerythritol tetrakis(thioglycolate)
"PETP" (trade name, Yodo Kagaku Co.)
Pentaerythritol tetrakis($\beta$-thiopropionate)

Preparation 1

A 100 g portion of the thiol-type curing agent "Epomate QX-12" (trade name, Yuka Shell Co.) was placed in a 1 liter Erlenmeyer flask, and 500 ml of acetone was added thereto for dissolution. The solution exhibited a strong alkalinity on pH 20 test paper. Concentrated hydrochloric acid was added dropwise to the solution while stirring to adjust the pH of the solution to weak acidity, and then the solvent was distilled off under reduced pressure. To the residue was added 500 ml of distilled water, and extraction was performed 3 times with 500 ml of chloroform. Anhydrous magnesium sulfate was added to the organic layer and the mixture was allowed to stand overnight, after which the magnesium sulfate was filtered off and the filtrate was concentrated under reduced pressure to obtain purified QX-12. The alkali metal ion concentration of this substance was: $K^+ = 11.2$ ppm and $Na^+ = 1420$ ppm prior to the dealkalization treatment, but fell to $K^+ = 0.5$ ppm or less and $Na^+ = 3.2$ ppm after dealkalization treatment.

Preparation 2

A 20 g portion of "Epomate QX-12" was placed in a 300 ml Erlenmeyer flask, and 200 ml of methanol was added thereto for dissolution. To this solution was added 20 g of the cation exchange resin "Daia-ion PK216H" (product of Mitsubishi Kasei, Inc.), and the mixture was stirred for 3 hours. The ion exchange resin was then filtered off, and the filtrate was concentrated under reduced pressure to obtain purified QX-12. The alkali metal ion concentration of this substance was $K^+ = 2.2$ ppm and $Na^+ = 7.9$ ppm.

Preparation 3

To a 500 ml three neck flask equipped with a dropping funnel were added 50 g of phenyl isocyanate and 200 ml of dichloromethane, and 25 g of 1,1-dimethylhydrazine was added dropwise thereto while stirring on ice. After dropping, the mixture was returned to room temperature and stirred for 3 hours, after which the dichloromethane was distilled off under reduced pressure to obtain a white, solid crude product. The obtained crude product was washed with 200 ml of petroleum ether to obtain 72 g (96% yield) of N-phenyl-N',N'dimethylaminourea.

EXAMPLE 1

To a mixture prepared by adding 1 part by weight of "Ajicure PN-H" to 10 parts by weight of the bisphenol A-type epoxy resin "EP828" (trade name, Yuka Shell Co.) at room temperature was added 90 parts by weight of the purified QX-12 obtained in Preparations 1 and 2, and this was mixed at room temperature to obtain epoxy resin compositions (i) and (ii). The working life for both compositions (i) and (ii) was 3 hours. Also, the gel time for composition (ii) at 60° C. was 925 seconds.

Comparison Example 1

Epoxy resin composition (iii) was obtained in the same manner as in Example 1, except that non-dealkalinized "Epomate QX-12" was used as the polythiol compound. The working life for composition (iii) was 3 minutes.

EXAMPLES 2-5

Epoxy resin compositions (iv)–(vii) were prepared using "EP828" as the epoxy resin, "TMTP" (trimethylolpropane tris($\beta$-thiopropionate), trade name of Yodo Kagaku Co. K+: <0.5 ppm, Na+: 2.9 ppm) as the polythiol compound, and the substances shown in Table 1 as the solid dispersion-type amine adduct latent curing accelerators. The properties of compositions (iv)–(vii) are shown in Table 1.

Comparison Examples 2-7

Epoxy resin compositions (viii)–(xiii) were prepared in the same manner as in Examples 2-5, except that, instead of the solid dispersion-type amine adduct latent curing accelerators were used the liquid accelerators "Epomate B-02" (adduct of 3,9-bis(aminopropyl)-2,4,8,10-tetraoxaspiro-[5,5]-undecane and butylglycidyl ether (liquid), trade name of Yuka Shell Co.), "2E4MZ" (2-ethyl-4-methylimidazole, trade name of Shikoku Kasei) and "DMP-30" (2,4,6-tris(dimethylaminomethyl)phenol). The properties of compositions (viii)–(xiii) are shown in Table 1. The present invention is characterized by providing a long working life and allowing a short curing time in comparison to the examples in which liquid or soluble amine compounds were used as the accelerators.

EXAMPLE 6

To 100 parts by weight of "EP828" was added 2 parts by weight of "Ajicure PN-H" and these were mixed at room temperature, after which "TMTP" was added thereto and the components were mixed while defoaming to prepare epoxy resin compositions (xiv)–(xviii). The properties of each of the compositions and their properties after curing at 80° C. for 20 minutes are shown in Table 2.

TABLE 2

| Epoxy Composition | | xiv | xv | xvi | xvii | xviii |
|---|---|---|---|---|---|---|
| EP828 | (Parts) | 100 | 100 | 100 | 100 | 100 |
| TMTP | (Parts) | 74 | 66 | 59 | 52 | 44 |
| Ajicure PN-H | (Parts) | 2 | 2 | 2 | 2 | 2 |
| Gel Time 80° C. | (sec) | 213 | 204 | 184 | 175 | 169 |
| Working Life | | 3 days | 3 days | 3 days | 4 days | 4 days |
| Tensile Shear Adhesive Strength | (kgf/cm$^2$) | 210 | 209 | 186 | 145 | 76 |
| T-peel Adhesive Strength | (kgf/25 mm) | 1.0 | 1.1 | 4.8 | 8.1 | 8.9 |

EXAMPLE 7

To 100 parts by weight of "EP828" was added 3 parts by weight of "Ajicure PN-H", and these were mixed at room temperature, and then 74 parts by weight of "TMTP" was added thereto and the components were mixed while defoaming, after which "MR-200" (diphenylmethane-4,4'-diisocyanate: product of Nippon Polyurethane, Inc.) was added thereto, to prepare epoxy resin compositions (xix)–(xxii). The gel times at 80° C. and the shear adhesive strengths after curing at 80° C. for 20 minutes for each of the compositions are shown in Table 3.

TABLE 3

| Epoxy Composition | | xix | xx | xxi | xxii |
|---|---|---|---|---|---|
| EP828 | (Parts) | 100 | 100 | 100 | 100 |
| TMTP | (Parts) | 74 | 74 | 74 | 74 |
| Ajicure PN-H | (Parts) | 3 | 3 | 3 | 3 |
| MR-200 | (Parts) | 0 | 1 | 4 | 10 |
| Gel Time 80° C. | (sec) | 109 | 117 | 123 | 130 |
| Tensile Shear Adhesive Strength | (kgf/cm$^2$) | 210.0 | 215.7 | 230.7 | 255.1 |

TABLE 1

| | Epoxy Composition | Epoxy Resin /Parts | Thiol Compound /Parts | Curing Accelerator /Parts | Initial Viscosity (poise) | Gel Time (second) 60° C. | Gel Time (second) 80° C. | Working Life |
|---|---|---|---|---|---|---|---|---|
| Example 2 | iv | EP828/100 | TMTP/74 | Ajicure PN-H/1 | 13.0 | 1398 | 314 | 7 days |
| Example 3 | v | EP828/100 | TMTP/74 | Ajicure MY-24/1 | 13.0 | 485 | 144 | 8 hrs |
| Example 4 | vi | EP828/100 | TMTP/74 | Novacure HX-3742/3 | 13.0 | 1772 | 380 | 7 days |
| Example 5 | vii | EP828/100 | TMTP/74 | Novacure HX-3721/1 | 13.0 | 2598 | 666 | 1 day |
| Comparison 2 | viii | EP828/100 | TMTP/74 | TDAMP*/1 | 13.0 | — | 275 | 25 min |
| Comparison 3 | ix | EP828/100 | TMTP/60 | m-Xylenediamine/4 | 15.0 | — | >7200 | 17 hrs |
| Comparison 4 | x | EP828/100 | TMTP/60 | Ethanolamine/5 | 15.0 | — | 2478 | 30 min |
| Comparison 5 | xi | EP828/100 | TMTP/60 | Epomate B-02/10 | 18.0 | — | 3729 | 4 hrs |
| Comparison 6 | xii | EP828/100 | TMTP/74 | 2E4MZ/5 | 14.0 | — | 451 | 8 hrs |
| Comparison 7 | xiii | EP828/100 | TMTP/74 | DMP-30/1 | 13.0 | — | 275 | 25 min |

*TDAMP: Tris(dimethylaminomethyl)phenol

EXAMPLE 8

In the polythiol compounds listed in Table 4 was dissolved at room temperature 3 parts by weight of the N-phenyl-N',N'-dimethylaminourea obtained in Preparation 3, 100 parts by weight of "EP-828" was added thereto, and the components were mixed while defoaming to obtain epoxy resin compositions (xxiii)–(xxviii). Compositions (xxiii)–(xxviii) were completely uniform liquids. The properties of compositions (xxiii)–(xxviii) are shown in Table 4.

TABLE 4

| Epoxy Composition | | xxiii | xxiv | xxv | xxvi | xxvii | xxviii |
|---|---|---|---|---|---|---|---|
| EP828 | (Parts) | 100 | 100 | 100 | 100 | 100 | 100 |
| TMTP | (Parts) | 70 | 0 | 0 | 0 | 0 | 0 |
| TMTG | (Parts) | 0 | 63 | 0 | 0 | 0 | 0 |
| PETG | (Parts) | 0 | 0 | 57 | 0 | 0 | 0 |
| PETP | (Parts) | 0 | 0 | 0 | 64 | 51 | 38 |
| N-Phenyl-N',N'-dimethylaminourea | (Parts) | 3 | 3 | 3 | 3 | 3 | 3 |
| Gel Time 100° C. | (min) | — | — | 64 | 46 | 44 | 35 |
| Gel Time 120° C. | (min) | 23 | 25 | 19 | 18 | 19 | 17 |
| Initial Viscosity | (poise) | 10 | 13 | 37 | 27 | 36 | 46 |
| Shelf Life | (week) | 3 | 3 | 3 | 4 | 4 | 4 |
| Water Absorption in Boiling Water 1 H | (%) | 0.7 | 0.8 | 0.8 | 0.8 | — | — |
| Tensile Shear Adhesive Strength | (kgf/cm$^2$) | — | — | — | — | 226 | — |
| T-peel Adhesive Strength | (kgf/25 mm) | — | — | — | — | 3.3 | — |

EXAMPLE 9

In 51 parts by weight of "PETP" was dissolved at room temperature 3 parts by weight of N-phenyl-N',N'-dimethylaminourea, 100 parts by weight of an epoxy resin was added thereto, and the components were mixed while defoaming to obtain epoxy resin compositions (xxix)–(xxx). Compositions (xxix)–(xxx) were completely uniform liquids. The properties of compositions (xxix)–(xxx) are shown in Table 5.

TABLE 5

| Epoxy Composition | | xxix | xxx |
|---|---|---|---|
| EP828 | (Parts) | 0 | 50 |
| EP-152 | (Parts) | 100 | 0 |
| EP-154 | (Parts) | 0 | 50 |
| PETP | (Parts) | 51 | 51 |
| N-Phenyl-N',N'-dimethylaminourea | (Parts) | 3 | 3 |
| Gel Time 100° C. | (min) | 38 | 38 |
| Gel Time 120° C. | (min) | 15 | 14 |
| Initial Viscosity | (poise) | 81 | 160 |
| Shelf Life | (week) | 3 | 3 |

EXAMPLE 10

In 74 parts by weight of "TMTP" was dissolved at room temperature 3 parts by weight of a urea compound which was produced by a reaction of phenyl isocyanate and diethylamine, 100 parts by weight of "EP-828" was added thereto, and the components were mixed while defoaming to obtain epoxy resin composition (xxxi). Composition (xxxi) was a completely uniform liquid. The gel time of composition (xxxi) at 120° C. was 10 minutes, and its gel time at 100° C. was 24 minutes. The initial viscosity was 13 poise at 25° C. Also, the shelf life was 10 days.

EXAMPLE 11

In 74 parts by weight of "TMTP" was dissolved at room temperature 1 part by weight of a urea compound which was produced by a reaction of phenyl isocyanate and diethylamine, 100 parts by weight of "EP-828" was added thereto, and the components were mixed while defoaming to obtain epoxy resin composition (xxxii). Composition (xxxii) was a completely uniform liquid. The gel time of composition (xxxii) at 120° C. was 15 minutes, and its gel time at 100° C. was 36 minutes. The initial viscosity was 10 poise at 25° C. Also, the shelf life was 2 weeks.

EXAMPLE 12

In 74 parts by weight of "TMTP" was dissolved at room temperature 3 parts by weight of a urea compound which was produced by a reaction of phenyl isocyanate and di-nbutylamine, 100 parts by weight of "EP-828" was added thereto, and the components were mixed while defoaming to obtain epoxy resin composition (xxxiii). Composition (xxxiii) was a completely uniform liquid. The gel time of composition (xxxiii) at 120° C. was 14 minutes. The initial viscosity was 7 poise at 25° C. Also, the shelf life was 3 weeks.

EXAMPLE 13

One hundred parts by weight of "EP-828" and 3 parts by weight of 2,4-bis(N,N-dimethylurea)toluene were kneaded together, 74 parts by weight of "TMTP" was added thereto, and the components were stirred and mixed to obtain epoxy resin composition (xxxiv). Composition (xxxiv) was a completely uniform liquid. The gel time of composition (xxxiv) at 80° C. was 12 minutes. Also, the working life was 5 days.

EXAMPLE 14

One hundred parts by weight of "EP-828" was mixed and kneaded with 3 parts by weight of the product of a reaction of tris-(3-isocyanato-4-methylphenyl)isocyanurate and 2methylimidazole, 74 parts by weight of "TMTP" was added thereto, and the components were stirred and mixed to obtain epoxy resin composition (xxxv). The gel time of composition (xxxv) at 80° C. was 20 minutes. Also, the working life was 3 days.

EXAMPLE 15

One hundred parts by weight of "EP-828" was kneaded with 3 parts by weight of the product of a reaction of tris-(3-isocyanato-4-methylphenyl)isocyanurate and dimethylaminopropylamine, 74 parts by weight of "TMTP" was added thereto, and the components were stirred and mixed to obtain epoxy resin composition (xxxvi). The gel time of composition (xxxvi) at 80° C. was 12 minutes. Also, the working life was 1 month.

EXAMPLE 16

To 100 parts by weight of "EP-828" was added 1 part by weight of "Fujicure FXE-1000" and these were mixed at room temperature, after which 74 parts by weight of "TMTP" was added thereto, and the components were mixed while defoaming to obtain epoxy resin composition (xxxvii). The gel time of composition (xxxvii) at 80° C. was 5 minutes, and the gel time at 60° C. was 18 minutes. The initial viscosity was 3 poise at 25° C. Also, the working life was 5 days.

As mentioned above, the polythiol epoxy resin compositions according to the present invention have excellent curability at relatively low heating temperatures and provide strong adhesive strength, and thus are suitable for use in adhesive agents, sealing agents, casting materials and the like. By adding an isocyanate group-containing composition to the epoxy resin compositions according to the present invention, the adhesive strength may be improved without significantly impairing the curability of the resin. In addition, the epoxy resin compositions according to the present invention have a very long working life, and therefore they are extremely useful from the point of view of improving working efficiency. Furthermore, since it is possible to preserve the excess composition after use, there is no longer any need to discard it, and as a result the compositions according to the present invention are extremely useful from the standpoint of conservation of resources and environmental protection, as well.

Obviously, numerous modifications and variations of the present invention are possible in light of the above teachings. It is therefore to be understood that, within the scope of the appended claims, the invention may be practiced otherwise than as specifically described herein.

What is claimed as new and desired to be secured by Letters Patent of the United States is:

1. An epoxy resin composition, consisting essentially of (1) an epoxy resin which has two or more epoxy groups in its molecule, (2) a polythiol compound which has two or more thiol groups in its molecule and (3) an accelerator selected from the group consisting of (i) a solid dispersion-type amine-epoxy adduct latent curing accelerator and (ii) a product of a reaction between a compound which contains one or more isocyanate groups in its molecule and a compound which has at least one primary and/or secondary amino group in its molecule.

2. The epoxy resin composition of claim 1, wherein said accelerator is (3)(i) a solid dispersion-type amine-epoxy adduct latent curing accelerator.

3. The epoxy resin composition of claim 1, wherein said accelerator is (3)(ii) a product of a reaction between a compound which contains one or more isocyanate groups in its molecule and a compound which has at least one primary and/or secondary amino group in its molecule.

4. An epoxy resin composition, prepared by a process comprising adding an isocyanate group-containing compound to an epoxy resin composition according to claim 2, at a proportion of 0.1–20 parts by weight to 100 parts by weight of said epoxy resin.

5. The epoxy resin composition of claim 1, wherein said epoxy resin (1) and said polythiol compound (2) are present in relative amounts such that the ratio of epoxy equivalents to thiol equivalents is 0.5 to 1.5.

6. The epoxy resin composition of claim 5, wherein said ratio of epoxy equivalents to thiol equivalents is 0.75 to 1.3.

7. The epoxy resin composition of claim 1, wherein said solid dispersion-type amine-epoxy adduct is present in an amount of 0.1 to 10 parts by weight per 100 parts by weight of epoxy resin composition.

8. The epoxy resin composition of claim 1, wherein said solid dispersion-type amine-epoxy adduct is present in an amount of 0.5 to 5 parts by weight per 100 parts by weight of epoxy resin composition.

9. A cured epoxy resin, prepared by heating an epoxy resin composition consisting essentially of (1) an epoxy resin which has two or more epoxy groups in its molecule, (2) a polythiol compound which has two or more thiol groups in its molecule and (3) an accelerator selected from the group consisting of (i) a solid dispersion-type amine-epoxy adduct latent curing accelerator and (ii) a product of a reaction between a compound which contains one or more isocyanate groups in its molecule and a compound which has at least one primary and/or secondary amino group in its molecule.

10. The cured epoxy resin of claim 9, wherein said accelerator is (3)(i) a solid dispersion-type amine-epoxy adduct latent curing accelerator.

11. The cured epoxy resin of claim 9, wherein said accelerator is (3)(ii) a product of a reaction between a compound which contains one or more isocyanate groups in its molecule and a compound which has at least one primary and/or secondary amino group in its molecule.

12. The cured epoxy resin of claim 9, wherein said epoxy resin (1) and said polythiol compound (2) are present in relative amounts such that the ratio of epoxy equivalents to thiol equivalents is 0.5 to 1.5.

13. The cured epoxy resin of claim 12, wherein said ratio of epoxy equivalents to thiol equivalents is 0.75 to 1.3.

14. The cured epoxy resin of claim 9, wherein said solid dispersion-type amine-epoxy adduct is present in an amount of 0.1 to 10 parts by weight per 100 parts by weight of epoxy resin composition.

15. The cured epoxy resin of claim 9, wherein said solid dispersion-type amine-epoxy adduct is present in an amount of 0.5 to 5 parts by weight per 100 parts by weight of epoxy resin composition.

* * * * *